United States Patent [19]

Akkerman

[11] 4,283,995
[45] Aug. 18, 1981

[54] RECIPROCATING ENGINES

[75] Inventor: James W. Akkerman, Houston, Tex.

[73] Assignee: The United States of America as represented by the Administrator of the National Aeronautics and Space Administration, Washington, D.C.

[21] Appl. No.: 847,276

[22] Filed: Oct. 31, 1977

[51] Int. Cl.³ ........................ F01L 21/02; F01L 23/00
[52] U.S. Cl. ........................................ 91/410; 91/325; 91/341 R
[58] Field of Search .................. 91/325, 410, 243, 402, 91/341 R

[56] References Cited

U.S. PATENT DOCUMENTS

| | | | |
|---|---|---|---|
| 734,533 | 7/1903 | Fouts | 91/325 |
| 1,003,953 | 9/1911 | Simons | 91/325 |
| 1,203,018 | 10/1916 | Larson | 91/325 |
| 1,409,309 | 3/1922 | Nordberg | 91/325 |
| 2,402,699 | 6/1946 | Williams | 91/325 |
| 2,588,478 | 3/1952 | Brown | 91/325 |
| 3,703,848 | 11/1972 | Brown | 91/325 |
| 4,168,655 | 9/1979 | Kitrilabis et al. | 91/325 |

Primary Examiner—Paul E. Maslousky
Attorney, Agent, or Firm—Marvin J. Marnock; John R. Manning; Marvin F. Matthews

[57] ABSTRACT

In a hydrazine powered engine, an intake valve arrangement for positively controlling the opening and closing of the poppet valve in a hot gas cylinder, the poppet valve being operated by the piston and gas pressure only. The poppet valve uses a pneumatic "spring" which holds the poppet valve against the piston while the valve is opened and closed. To accomplish this, a poppet valve is slidably mounted in a "pneumatic spring" chamber which reaches a pressure approaching the gas supply pressure and, during the opening of the valve, the "spring" chamber retains enough pressure to hold the poppet valve onto the piston. In addition, the bottom of the poppet valve can have a suction cup type configuration to hold the poppet valve on the piston during the down stroke.

5 Claims, 7 Drawing Figures

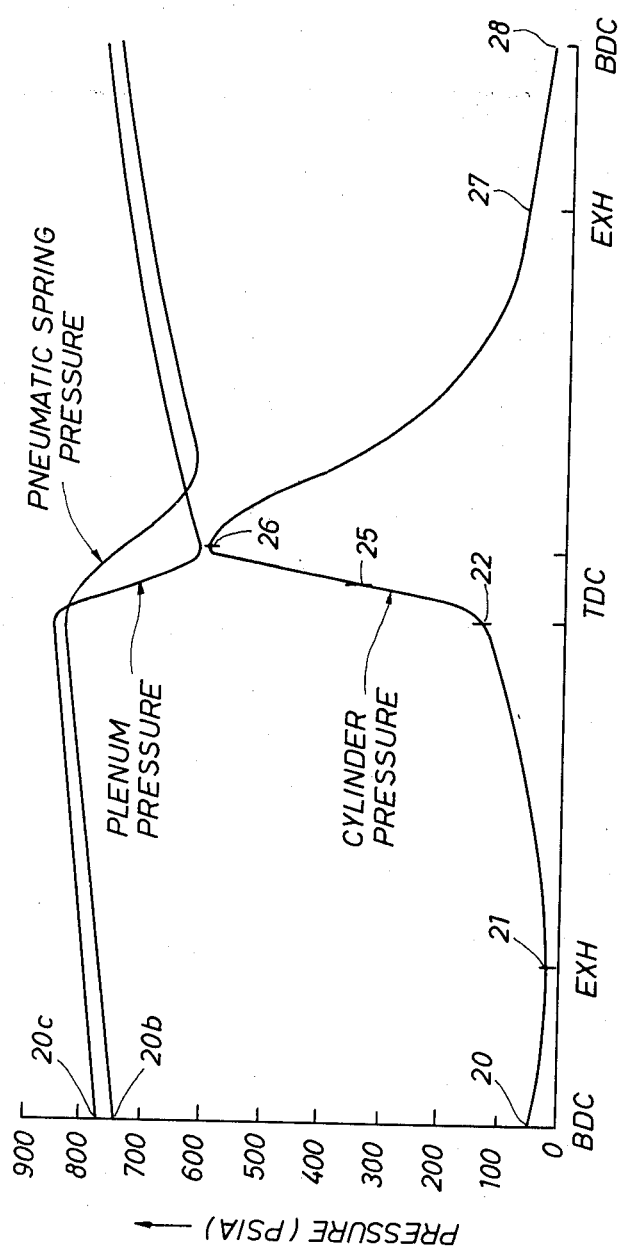
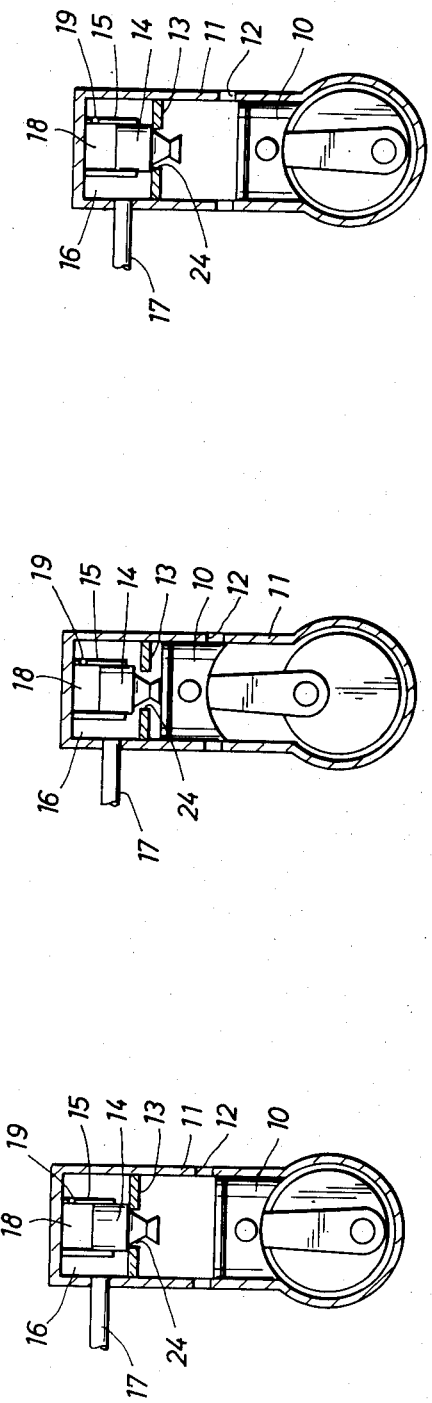
FIG. 1

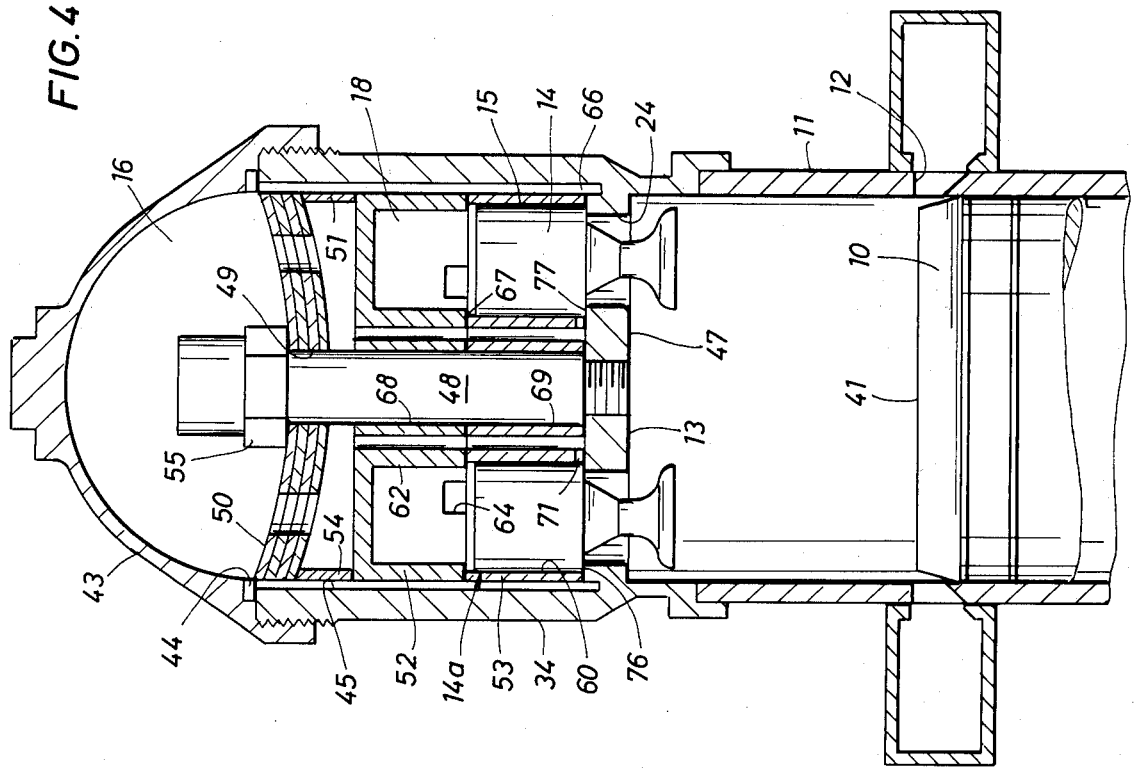
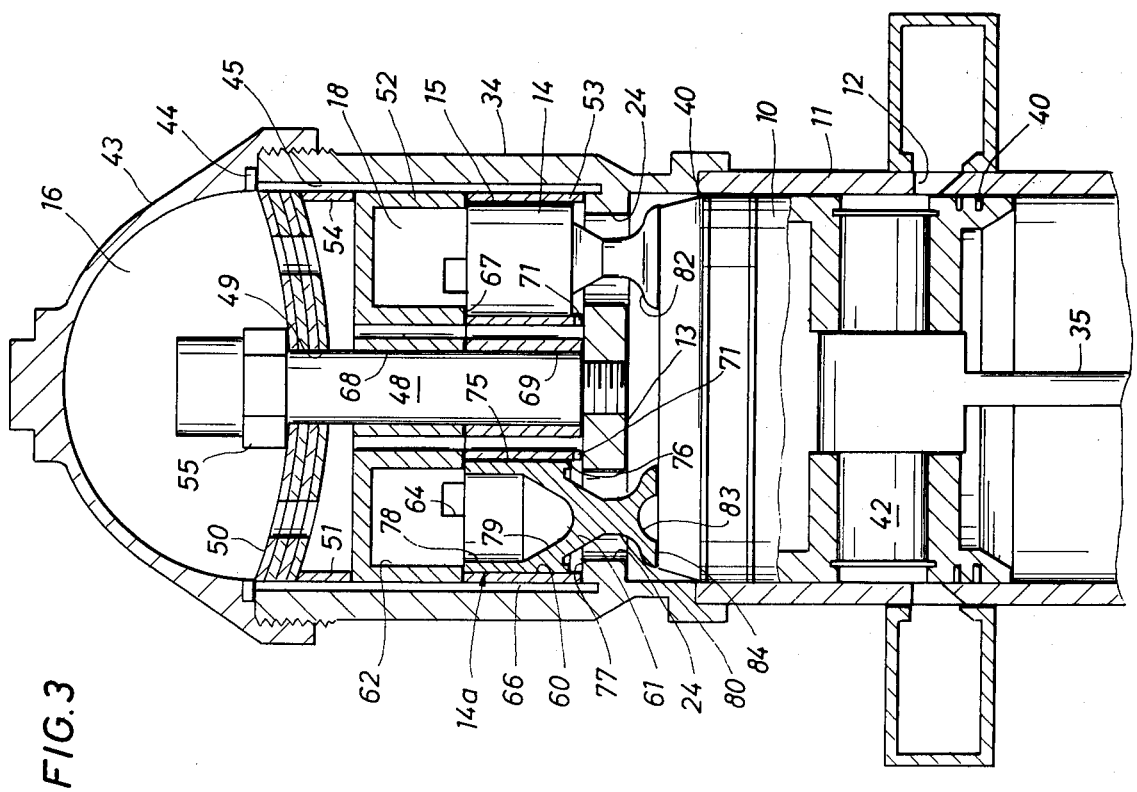

RECIPROCATING ENGINES

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates to piston operated engines, and more particularly, to poppet valve arrangements for a piston engine utilizing the piston for moving the valve and hot gas for limiting the movement function of the poppet valves during its open phase.

BACKGROUND OF THE INVENTION

Hydrazine is an available energy source which has a high energy content and easily converts from a liquid into a hot gas at about 1600° F. Hydrazine has been used on rockets and high power turbine machines but has not typically been used for systems in the range of 10 to 15 horsepower. Small remote piloted aircraft for high altitudes can be operated on 15 to 50 horsepower for obtaining air samples. The difficulty, however, is to have a low weight, high energy capability in an engine.

In designing a piston operated engine with poppet valves there are several problems involved in conventional cam and spring arrangements. Principally, the problems include excessive cooling and/or heat leak problems with the stem arrangement. Also, the actuating train and cam arrangements are excess weight (if they cannot be eliminated). Slider type poppet valves typically have short lives and are complex as compared to a poppet valve actuated by a piston. Any approach which minimizes weight and complexity and is compatible with high temperatures has merit. While there are systems heretofore proposed for eliminating camshafts, none of these systems have addressed the problem of controlling the movement of the poppet valve in a hot gas atmosphere. For reference, a prior art system is disclosed in U.S. Pat. No. 3,842,812 which describes a four cycle internal combustion engine where the poppet valve arrangement is piston actuated and intended to increase the efficiency of supplying fuel. However, the present invention uses no moving parts other than the poppet valve itself.

SUMMARY OF THE INVENTION

The present invention contemplates a piston type engine having a piston and cylinder arrangement. At the upper end of the cylinder is a high pressure gas plenum and gas valve arrangement. The gas valve arrangement includes a cylindrical valve body which carries six equiangularly spaced gas valves. Above the valve body is a cylindrical pneumatic spring body which has six equiangularly spaced, pneumatic spring chambers in alignment with the gas valves. At the bottom of the valve body, each of the guides for the gas valves is in communication with a valve seat opening and parallel bypass openings to the upper high pressure gas plenum. While the gas valves are closely fitted in their valve guides there is sufficient space to allow leakage during the period that the gas valve is seated on the valve seat. During this period the gas pressure in the pneumatic spring chamber above a gas valve will approach the gas pressure in the high pressure gas supply plenum. The gas valve extends through the valve seat opening and has a downwardly facing cup portion. When the piston head engages the gas valves they are lifted with the piston against the pressure in the spring chambers so that the gas valves are retained firmly on the head of the piston. On the down stroke, the cup portion traps gas under sufficient differential pressure to carry the gas valve downwardly with the piston.

Other features, advantages and objects of the present invention will become more apparent from the following detailed description and claims and from the accompanying drawings herein:

BRIEF DESCRIPTION OF THE DRAWINGS

FIG. 1 illustrates a graph of pressures as a function of piston position for a complete cycle together with diagrammatic piston position illustrations below the graph;

FIG. 3 is a view in cross-section through a piston and cylinder illustrating the piston in a top dead center position;

FIG. 4 is a view in cross-section through a piston and cylinder illustrating the piston in a bottom center position;

DESCRIPTION OF THE PREFERRED EMBODIMENT

Figure 2:
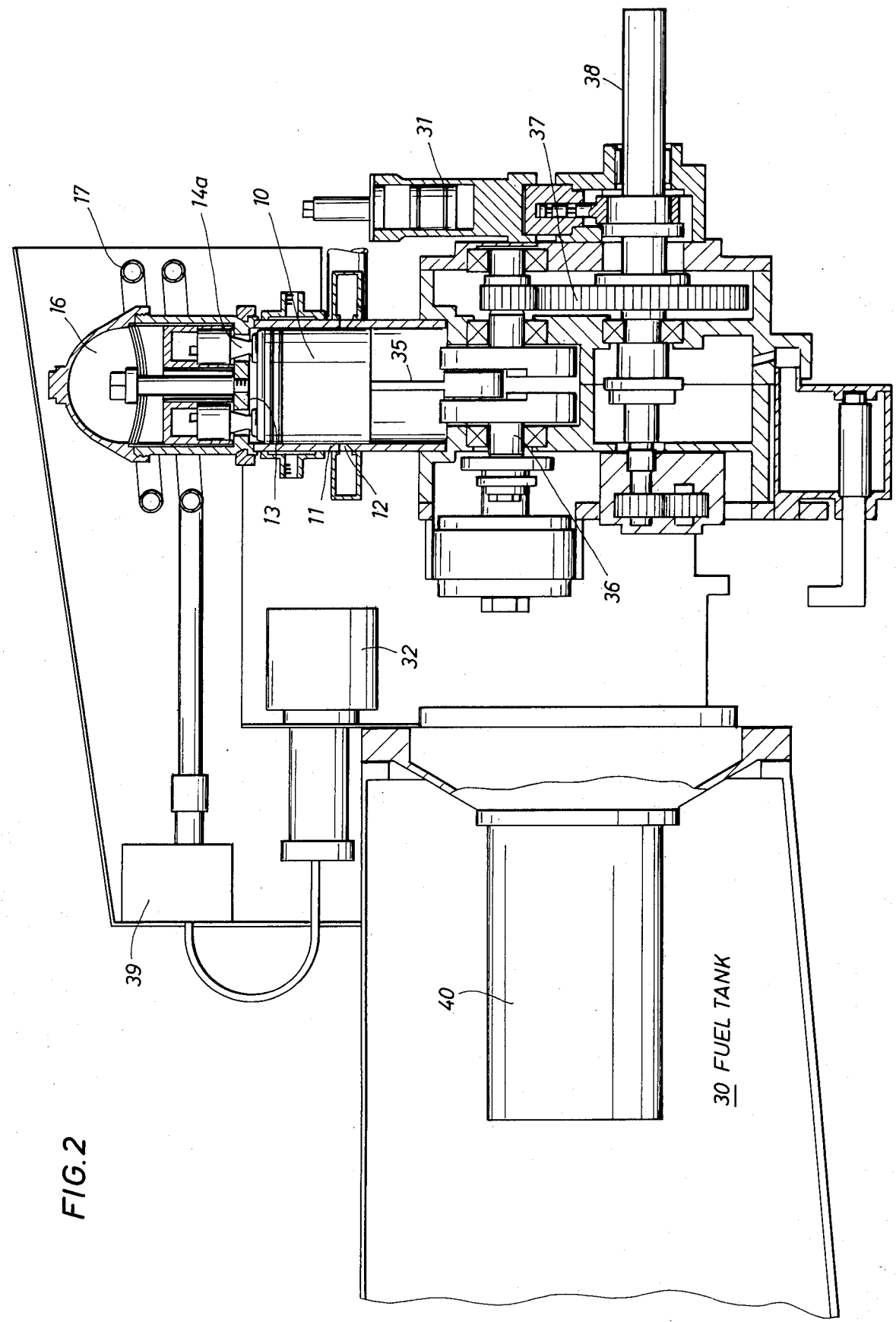
FIG. 2 is a view of an engine to illustrate the environment for application of the present invention.
Figure 5:
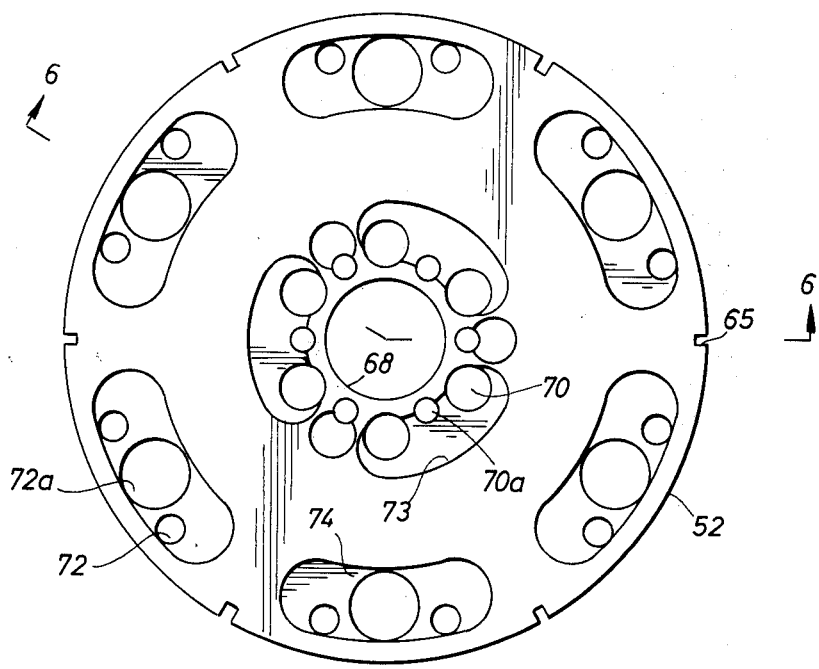
FIG. 5 is a top plan view of the pneumatic spring chamber body.
Figure 6:
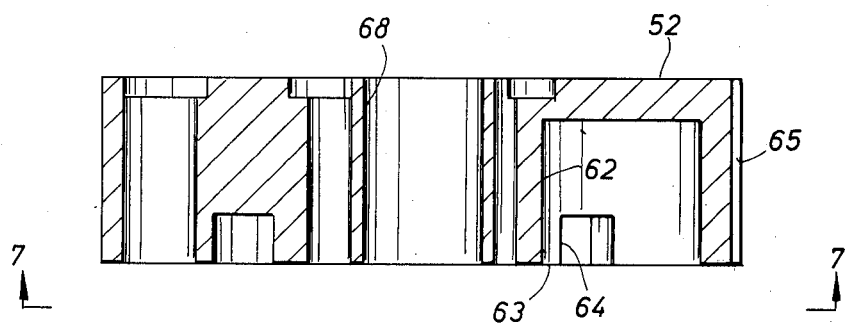
FIG. 6 is a view in cross-section taken along line 6—6 of FIG. 5.
Figure 7:
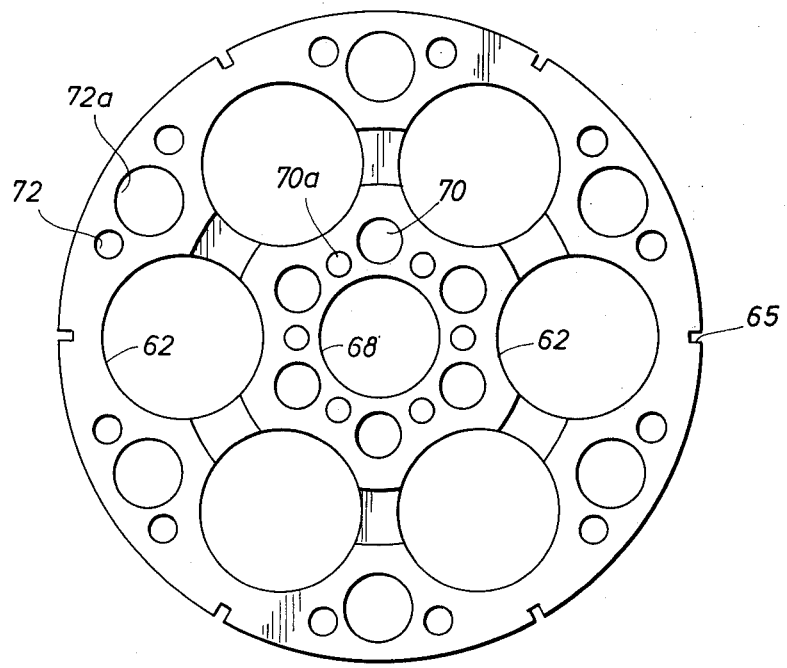
FIG. 7 is a bottom plan view of the pneumatic spring chamber body.

Referring now to FIG. 1, a graph is plotted of pressure amplitude relative to the valve and piston positions in a cycle of operation. As illustrated, pressure is set forth in increasing amplitude along a vertical axis and the horizontal axis depicts piston positions from "BDC" (Bottom dead center) to "TDC" (Top dead center) to "BDC". The exhaust "EXH" points for the cylinder are also indicated along the horizontal axis. Referring to the graph, in a bottom dead center position (far left position of FIG. 1) a piston 10 is in a lower most position in a cylinder 11. The cylinder 11 has exhaust ports 12 located just above the piston 10 in its BDC position. The cylinder 11 has an upper transverse head cap 13 which contains a poppet or gas valve 14. The poppet valve 14 is slidably mounted in a valve guide 15. The interior of the valve guide 15 above the poppet valve 14 is herein called the pneumatic spring chamber 18 and is ported at its upper end by ports 19 to a high pressure chamber or plenum 16. The high pressure gas storage chamber 16 (herein sometimes called plenum) is above the head cap 13 and supplied by a gaseous fuel inlet pipe 17.

In the diagrammatic illustration of the BDC position of the piston 10 in FIG. 1 the pressure in the cylinder 11 is at a low value as illustrated by the point 20 on the graph. At the same condition, the pneumatic spring chamber 18 and plenum 16 are at relatively high pressures as indicated by numerals 20b and 20c. As the piston 10 moves upwardly, the exhaust ports 12 are closed (see point 21 on graph) and the pressures generally increase in the cylinder 11, the spring chamber 18 and the plenum 16. At the point 22 on the graph, the piston 10 is approaching a top dead center position and engagement of the piston 10 with the poppet valve 14 opens the valve port 24 in the head cap 13. As the port 24 is opened, the pressure in the plenum 16 drops rapidly as the working fluid in the plenum 16 transfers to the cylinder 11. During the time that the pressure in the plenum 16 drops, the pressure in the spring chamber 18 also drops but at a relatively slow rate controlled by the size of the ports 19. The piston 10 subsequently passes through the maximum upper travel point 25 and then travels downwardly. As the piston 10 travels downwardly, the poppet valve 14 is pressure attached to the top of the piston 10 and moves downwardly therewith. At the point 26 on the graph, the poppet valve closes the port 24 and the gas expansion in the chamber 11 moves the piston 10 downwardly. As the piston 10 moves downwardly, the pressure in the plenum 16 and spring chamber 18 again builds up. At the point 27 on the graph, the piston 11 opens the exhaust ports 12 and continues its travel to the BDC point 28 shown on the graph. From point 28, the cycle repeats.

FIG. 1 illustrates a poppet valve 14 for admitting high pressure gaseous fluid without requiring a cam actuation. As the poppet valve 14 is initially opened, the spring chamber 18 provides pressure to hold the poppet valve against the upper surface of the piston 10. The bottom of the poppet valve 14 is shaped to trap a volume of gas between the poppet valve 14 and the piston 10. The pressure differential relative to the trapped space of the poppet valve 14 maintains the poppet valve 14 against the upper surface of the piston while it moves downwardly. These two features prevent "chattering" of the poppet valve and hold the poppet valve 14 in contact with the piston 10 through the "open" phase of the poppet valve 14.

Referring now to FIG. 2, a cross-section through a typical engine arrangement is illustrated. In FIG. 2, a fuel tank 30 contains liquid hydrazine fuel which is converted from liquid to gaseous form and supplied to the high pressure chamber 16 via a fuel pump 31, control valve 32, gas generator 39 and pipes 17. The chamber 16 is separated from the cylinder 11 by a poppet assembly 14a at the head of each cylinder 11. The piston 10 in cylinder 11 operates through a connecting rod 35 to move a crankshaft 36. The crankshaft 36 drives a gear train 37 which rotates the propeller drive shaft 38. Excess heat is rejected to the fuel via a heat exchanger 33 located in the fuel tank. Various other assemblies are illustrated but are not described herein because they are not necessary for an understanding of the invention.

Referring now to FIGS. 3 and 4, FIG. 3 illustrates a cylinder 11 with the piston 10 in a TDC position while FIG. 4 illustrates a piston 10 in a BDC position. The piston 10 has piston rings 40, a flat top surface 41 and is connected by a wrist pin 42 to a connecting rod 35. Attached to the upper end of the cylinder 11 is a tubular body member 34 with a dome-shaped closure member 43 at its upper end. Between the closure member 43 and tubular body member 34 is an annular recess 44 which opens to circumferentially spaced, longitudinal keyways 45. The longitudinal keyways 45 extend lengthwise of the tubular body member 34. The tubular body member 34 at its lower end has a transverse head or cap plate 47 (corresponds to 13 in FIGS. 1 and 2). The head plate 47 has a centrally located pin member 48 which extends upwardly and through a central opening 49 in a series of stacked spring washers 50 also provided with aligned openings 50a radially spaced from the control opening 49. Between the pin member 48 and cylindrical wall 51 of the tubular member 34 is an annulus which receives an upper pneumatic spring body member 52 and lower poppet valve body member 53. Above the upper annular body member 52 is a tubular hold down ring 54 which is disposed between the upper pneumatic spring surface of the upper body member 52 and the edge of the spring washers 50. The spring washers 50 are concave shaped. By virtue of the shape of the spring washers and a latch nut 55 on the pin members 48, the spring washers 50 hold the ring member 54 against the pneumatic spring body member 52.

The lower poppet valve body member 53 has six, equiangularly spaced, vertical poppet guide openings 60 disposed around the pin member 48 for respectively receiving the poppet valves 61 (See FIG. 3 for cross-section). The poppet valves are slidably received in each of the poppet guide openings 60.

Referring to FIGS. 3–7, the construction of the pneumatic spring body member 52 is illustrated in detail. The structure of the spring body member 52 includes six, equiangularly spaced, blind bores 62 which are interconnected at their open ends 63 by interconnecting slots or channels 64. This provides for equalization of gas pressures within the various blind bores 62. The periphery of the spring chamber body member 52 has vertical keyway slots 65 which are adapted for alignment with the keyways 45 of the tubular body member 34. Similarly, the valve body member 53 illustrated in FIGS. 3 and 4 has equiangularly spaced, vertical keyways 66 which are adapted to align with the keyways 45 of the tubular body member 34. Keys (not shown) in the keyways 34, 65, 66 fix the body members against rotation within the member 45 and align the members 52, 53 relative to one another. A keeper can be inserted in the groove 44. In the relative alignment of the members 52, 53 the poppet guide openings 60 are aligned with the blind bores 62. The blind bores 62 have a diameter dimension less than the diameter of the poppet guide openings 60 thereby forming downwardly facing shoulders 67.

Through the center of the body members 52, 53 are central bores 68, 69 for receiving the pin member 48. Between the central vertically aligned bores 68, 69 and the vertically aligned bores 60, 62 are a series of various diameter vertical bores 70, 70a which extend through both body members 52, 53. At the bottom of the bores 70, 70a channels 71 are provided to interconnect the bores 70, 70a to the interior of the poppet guide bores 60. Similarly around the periphery of the body members 52, 53 are vertical bores 72, 72a which similarly interconnect with the poppet guide bores 60 at the lower end. The upper surface of the spring body member 52 has arcuate slots 73, 74 cut into its upper surface to interconnect various bores 70, 70a, 72, 72a. The purpose of the bores 70, 70a, 72, 72a is to provide as large a flow or bypass passage as possible between the plenum 16 and the openings 71 in the poppet guide bores 60.

As shown in FIG. 3, the outside of a poppet valve 61 is shaped somewhat like an egg holder. The poppet valve 61 has an upper cylindrically shaped outer wall 75 disposed within the poppet guide bore 60. The wall 75 has a shorter length than the depth of the guidebore 60. The outer wall 75 at its lower end forms a downwardly facing shoulder 76 which is adapted to sealingly engage an upwardly facing surface 77 disposed about the poppet valve opening 24 in the head member 47. The upper part of the poppet valve 61 has a hollow portion formed by a bore 78 and ogive shaped depression 79. The central part of the poppet valve 61 tapers inwardly to a central part portion 80 which extends through the bore 24 and a lower pedestal portion 82 which is extended outwardly and has a dome shaped recess 83 extending upwardly and inwardly from a cylindrical sealing surface 84.

The operation of the poppet valves 61 is the same as described heretofore with respect to FIG. 1. The plenum 16 is charged with high pressure gas which is also present in the communication bores 70, 70a, 72, 72a and prevented from entering the expansion chamber above the piston 10 by virtue of the closed poppet valves 61. The poppet valves close by virtue of valve shoulders 76 engaging the sealing surface 77 as shown in FIG. 4. Not only the plenum 16 is charged with high pressure gas but the clearance space 61a between the poppet valves 61 and the poppet guide bores 60 as well as the spaces 67a between the body members 52, 53 permits the pressure in the blind bores 62 to reach almost the same level as the pressure in the plenum 16. The spaces 67a are shown in exaggerated size in FIG. 4 for purposes of illustration. This pressure is illustrated by the curves of FIG. 1. When the head of the piston 10 engages the poppet valves 61, the pressure in the spring chambers 18 formed by the blind bores 62 is trapped and the poppets 61 are urged upwardly to open the channels 71 and communicate the high pressure gas to the volume directly above the piston. At the time the pressure in the blind bores 62 is trapped it provides a cushioning effect on the rising poppet valves 61. As the piston 10 starts downwardly the high pressure gas is at a greater pressure than the trapped pressure in the recess 83 of a poppet valve 61 so that the pressure differential holds the poppet valve 61 on the top surface of the piston 10 until the valve closes.

It should be appreciated that the spring chambers 18 above a poppet valves 61 are in communication with the plenum 16 by virtue of bores 70-72, washer openings 50a, and clearance spaces 61a, 67a, all of which approximate or are equivalent to an opening 19 as shown in the valve guide 15 in FIG. 1. The period of time that the poppet valves are actuated or opened by the piston is very short as compared to the time for the piston to travel between top center positions. Because of the short time and small clearance, the pressure drop in the spring chamber does not drop nearly as fast as the plenum pressure to maintain the poppet valve against the piston.

What is claimed is:

1. In a piston operating engine, a new and improved gas charging valve arrangement comprising:
   a cylinder containing a piston reciprocable within said cylinder between top center and bottom center positions, said cylinder having an upper transverse head cap provided with an inlet port including a valve seat disposed about the perimeter of said port;
   a high pressure plenum chamber means disposed on the side of said transverse head cap opposite the piston;
   means adapted to supply high pressure gas to said plenum chamber means;
   fluid communication means including gas valve means movable between open and closed positions for placing high pressure gas in said plenum chamber in communication with said piston and cylinder when in the open position thereby inducing a pressure drop in said plenum chamber, said gas valve means including a valve element having an upper cylindrical stem portion, a reduced diameter portion providing an annular shoulder means for sealingly engaging said valve seat when the gas valve means is in the closed position, and a lower pedestal portion engageable by said piston when at and near its top center position whereby said valve element is lifted by said piston from the valve seat to place said gas valve means in the open position;
   pneumatic gas chamber means disposed on the side of said transverse head cap which is opposite the piston, said pneumatic gas chamber means including an upper pneumatic spring body member having a blind bore opening downwardly and a juxtaposed lower valve body member having a guide bore aligned and communicating with said blind bore, said guide bore receiving said cylindrical stem portion of the valve element for sliding movement therein;
   a restricted flow passage for communicating high pressure gas between said plenum chamber means and said pneumatic gas chamber means whereby gas pressure in the pneumatic gas chamber means acts on the valve element in opposition to the force exerted on the valve element by said piston,
   said flow passage being of sufficiently small dimension to restrict the flow of gas therefrom upon the opening of said gas valve means such that the pressure in said pneumatic gas chamber means drops at a slower rate than the pressure in said plenum chamber on opening of said gas valve means so as to temporarily exceed the plenum chamber pressure for the period when the valve element is moved to open position and at the time the valve element is moved to closed position and the pneumatic gas chamber means thereby acts as a pneumatic spring retaining said valve element in constant contact with said piston and tracking the movement of the piston throughout said period.

2. The engine as defined in claim 1 wherein said blind bore in said upper pneumatic spring body member is of larger diameter than said guide bore to thereby provide an internal downwardly facing shoulder means, said shoulder limiting the travel of said valve member towards the open position.

3. The engine as defined in claim 1 wherein said gas valve means includes a depression in the end surface of said lower pedestal portion of the gas valve element with a sealing surface disposed about said depression, said sealing surface being sealingly engageable with the top surface of said piston when contacted by said piston whereby a pressure differential is established by lower pressure trapped in said depression which acts to retain the valve element on the piston surface during the period of downward travel of the piston and valve element.

4. In a piston operating engine, a new and improved gas charging valve arrangement comprising:
   a plurality of cylinders each containing a piston reciprocable therein between top center and bottom center positions, each said cylinder having an upper transverse head cap provided with an inlet port including a valve seat disposed about the perimeter of said port;
   a high pressure plenum chamber means disposed on the side of the transverse head caps opposite the piston;
   means adapted to supply high pressure gas to said plenum chamber means;

communication means including gas valve means movable between open and closed positions for placing high pressure gas in said plenum chamber in communication with said pistons and cylinders when in the open position and thereby inducing a pressure drop in said plenum chamber, each said gas valve menas including a valve element having an upper cylindrical stem portion, a reduced diameter postion providing an annular shoulder means for sealingly engaging said valve seat when the gas valve means is in closed position, and a lower pedestal portion engageable by a piston when at and near its top center position whereby the valve element is lifted by the piston from the valve seat to place said gas valve means in the open position;

a plurality of pneumatic gas chamber means disposed on the side of said transverse head cap which is opposite the pistons, each said pneumatic gas chamber means being defined by a first body member means having a cylindrical blind bore and a second body member having an enlarged diameter bore aligned with said blind bore and forming a guide bore receiving the cylindrical stem portion of a valve element for sliding movement therein;

restricted flow passage means including a plurality of flow passages for communicating high pressure gas between said plenum chamber means and said pneumatic gas chamber means whereby the gas pressure in the pneumatic gas chamber means acts on said valve elements in opposition to the force exerted on the valve elements by said piston, each said flow passage being of sufficiently small dimension to restrict the flow of gas therefrom upon the opening of said gas valve means such that the pressure in said pneumatic gas chamber means drops at a slower rate than the pressure in said plenum chamber on opening of said gas valve means so as to temporarily exceed the plenum chamber pressure for the period when the valve element is moved to open position and at the time of valve element closing to thereby act as pneumatic springs retaining said valve elements in constant contact with said pistons and tracking the movement of the pistons throughout said period.

5. The engine as defined in claim 4 wherein a depression is provided in the end surface of each of said pedestal portions of the gas valve elements with a sealing surface disposed about each said depression, each said sealing surface being sealingly engageable with the top surface of a piston whereby a pressure differential formed by trapped gas in each said depression can be used to move each gas valve means towards the closed position.

* * * * *